US008910924B2

(12) United States Patent
Alanko (10) Patent No.: US 8,910,924 B2
(45) Date of Patent: Dec. 16, 2014

(54) TWIN CAM MECHANISM FOR A DROP LEG JACK

(75) Inventor: Erik Alanko, Wausau, WI (US)

(73) Assignee: Cequent Performance Products, Inc., Plymouth, MI (US)

( * ) Notice: Subject to any disclaimer, the term of this patent is extended or adjusted under 35 U.S.C. 154(b) by 268 days.

(21) Appl. No.: 13/494,482

(22) Filed: Jun. 12, 2012

(65) Prior Publication Data

US 2013/0092890 A1 Apr. 18, 2013

Related U.S. Application Data

(60) Provisional application No. 61/548,693, filed on Oct. 18, 2011.

(51) Int. Cl.
*B60S 9/02* (2006.01)
*B60S 9/08* (2006.01)

(52) U.S. Cl.
CPC .......................................... *B60S 9/08* (2013.01)
USPC ............ 254/420; 254/418; 254/424; 254/425

(58) Field of Classification Search
USPC .................................. 254/418, 420, 424, 425
See application file for complete search history.

(56) References Cited

U.S. PATENT DOCUMENTS

| 3,658,359 | A | 4/1972 | Claflin et al. |
| 4,097,840 | A | 6/1978 | Chappelle |
| 4,265,429 | A | 5/1981 | Formhals |
| 4,702,458 | A | 10/1987 | Kendrick |
| 4,860,841 | A | 8/1989 | Sacco |
| 4,978,104 | A | 12/1990 | Gipson, Jr. |
| 5,282,605 | A | 2/1994 | Sauber |
| 5,299,829 | A | 4/1994 | Rivers, Jr. et al. |
| 5,421,555 | A | 6/1995 | Sims |
| 5,423,518 | A * | 6/1995 | Baxter et al. ................... 254/419 |
| 5,435,523 | A | 7/1995 | Hying et al. |
| D390,503 | S | 2/1998 | Gleason et al. |
| 6,302,381 | B1 | 10/2001 | Roll |
| 6,446,937 | B1 | 9/2002 | Straw, Sr. et al. |
| 6,623,035 | B1 * | 9/2003 | Schneider ................... 280/766.1 |
| 6,874,764 | B2 | 4/2005 | Drake, III |
| 6,893,006 | B2 | 5/2005 | Drake, III |
| 7,325,786 | B2 | 2/2008 | Drake, III |
| D568,575 | S | 5/2008 | Walstrom et al. |
| D570,072 | S | 5/2008 | Walstrom et al. |
| 7,407,151 | B2 | 8/2008 | Rabska et al. |
| D577,175 | S | 9/2008 | Walstrom et al. |
| D595,922 | S | 7/2009 | Walstrom et al. |
| 8,091,922 | B2 * | 1/2012 | McMahan ................... 280/766.1 |

(Continued)

FOREIGN PATENT DOCUMENTS

CA 2693192 1/2009

*Primary Examiner* — Lee D Wilson
*Assistant Examiner* — Shantese McDonald
(74) *Attorney, Agent, or Firm* — McDonald Hopkins LLC (57) ABSTRACT

A jack for use with a towed vehicle is disclosed. The jack may include a first housing, a pair of cam surfaces, and a second housing telescopically moveable relative to the first housing. The jack may also include a pair of engaging members positionable to a first position generally inhibiting relative telescopic movement between the first and second housings and a second position generally not inhibiting relative telescopic movement between the first and second housings, and a handle attached to the engaging members, where the handle is selectively positionable along the cam surfaces positioning the engaging members to the first and second positions.

35 Claims, 8 Drawing Sheets

(56) References Cited

U.S. PATENT DOCUMENTS

| | | |
|---|---|---|
| 8,181,983 B2 | 5/2012 | Walstrom et al. |
| RE43,535 E | 7/2012 | Roll |
| 8,348,241 B2 | 1/2013 | Trowbridge et al. |
| 8,523,148 B2 | 9/2013 | Beck et al. |
| 2002/0116881 A1 | 8/2002 | Zimmerman |

* cited by examiner

TWIN CAM MECHANISM FOR A DROP LEG JACK

CROSS-REFERENCE TO RELATED APPLICATION

This application claims the benefit of U.S. Provisional Patent Application No. 61/548,693, entitled "Twin Cam Mechanism for a Drop Leg Jack," filed on Oct. 18, 2011, which is hereby incorporated in its entirety by reference.

FIELD OF THE INVENTION

The present invention is generally related to a drop leg jack and, more particularly, to a twin cam mechanism for a drop leg jack.

BACKGROUND

Jacks are often used in association with towed vehicles, such as trailers. Jacks may be used for many different functions in association with towed vehicles, including, without limitation, holding the towed vehicles in place when not connected to towing vehicles, appropriately positioning towed vehicles to operatively connect with towing vehicles, storing towed vehicles or any such similar situations. Additionally, jacks may be used with both loaded and unload towed vehicles. This may apply significantly varying loads on the jacks causing them to operate under significantly varying conditions. Jacks, therefore, may need to be capable of operatively functioning under these varying conditions.

It is often desirable to quickly provide elongation of the jack during operation. Jacks may, therefore, include a drop leg where there is no mechanical cranking required to achieve significant jack elongation or contraction in a short amount of time. This may be particularly useful at the beginning or completion of the lifting process of the jack.

However, when greater loads are applied to the jack, the mechanism that holds the drop leg in either of the raised or lowered position must be capable of handling this greater load. This may result in a more complex and expensive drop leg holding mechanism or may limit the available uses of a particular jack. These varieties of operating conditions may require that a jack be used only for a single specific or limited use.

Therefore, there is a need for a drop leg mechanism that may be used in a jack with a drop leg to permit such jack to be used in a wide variety of operating conditions and be used on various towed vehicles. There is also a need for a drop leg mechanism that may be efficiently operated.

SUMMARY

A jack may include a first housing, a pair of cam surfaces, and a second housing telescopically moveable relative to the first housing. The jack may also include a pair of engaging members positionable to a first position generally inhibiting relative telescopic movement between the first and second housings and a second position generally not inhibiting relative telescopic movement between the first and second housings, and a handle attached to the engaging members, where the handle is selectively positionable along the cam surfaces positioning the engaging members to the first and second positions.

In some embodiments, a jack may include a first housing having a pair of apertures, a drop leg telescopingly moveable relative to the first housing along an axis, where the drop leg includes at least a pair of apertures, and a pair of engaging members operatively attached with the first housing. The jack may also include a handle attached to the engaging members, the handle capable of positively driving the engaging members in a first direction engaging the apertures of the housing and apertures of the drop leg and in a second direction disengaging the apertures of the drop leg.

In some embodiments, a jack may include a first housing having a pair of apertures, a drop leg operatively engaged with the first housing, where the drop leg includes a plurality of apertures, and a pair of guide members attached to the first housing. The jack may also include a pair of engaging members positioned within the hollow members, a handle attached to the engaging members, the handle capable of being selectively positioned, where selective positioning of the handle engages or disengages the engaging members with the apertures of the first housing and a pair of the plurality of apertures of the drop leg, and where the handle includes a first portion and a second portion that is moveable relative to the first portion during selective positioning of the handle.

BRIEF DESCRIPTION OF THE DRAWINGS

Operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A jack 20 is shown in FIGS. 1-8. The jack 20 may be any appropriate type of jack, such as by way of a non-limiting example, a mechanical jack, screw jack, motorized jack or any combination of such. The present teachings are not limited to a specific type of jack and may be applied to any appropriate type of jack. The jack 20 may be operatively coupled to a towed vehicle 22 in any appropriate manner—an exemplary embodiment of such shown in FIG. 6. The jack 20, however, may be operatively coupled to any appropriate towed vehicle in any appropriate manner and is not limited to that shown and described herein.

The jack 20 may include an outer housing 24, an inner housing 26, and a drop leg 28. The outer and inner housings 24, 26 may be of any appropriate shape, such as by way of a non-limiting example, a generally square, rectangular, circular, diamond, rhombus, asymmetrical or oval cross-sectional shape. The inner housing 26 may be in a telescoping relationship with or otherwise telescopingly engaged with the outer housing 24. By way of a non-limiting example, the inner housing 26 may retract within or extend from the outer housing 24. Likewise, the drop leg 28 may be of any appropriate shape, such as by way of a non-limiting example, a generally square, rectangular, circular, diamond, rhombus, asymmetrical or oval cross-sectional shape. The drop leg 28 may be in telescoping relationship with or otherwise telescopingly engage with the inner housing 26. By way of a non-limiting example, the drop leg 28 may retract within and extend from the inner housing 26.

The drop leg 28 may be secured to and supported by a base 32 of any appropriate shape. The base 32 may be attached to the drop leg 28 in any appropriate manner, such as by way of a non-limiting example, welding, fastening, using adhesives, or the like. The base 32 may be a generally planar plate that may be shaped and sized to allow the jack 20 to freely stand when placed on a surface such as the ground. In some embodiments, the base 32 may be of any appropriate shape, such as generally square, rectangular, circular, oval, or the like, so as that it may generally add stability to the jack 20. More specifically, the base 32 may be shaped and sized such that the jack 20 may generally remain in an upright position without having to otherwise be supported by an item. Moreover, the base 32 may distribute load carried by the jack 20 to a substantially large contact area with the ground or any other appropriate surface.

The jack 20 may include a crank assembly 40, which may be used in a conventional manner to raise and lower the inner housing 26 relative to the outer housing 24 along an axis 39. This may result in the jack 20 being selectively positionable, i.e., extendable and retractable, so that the jack 20 may operate as necessary. In some embodiments, the crank assembly 40 may be a sidewind crank assembly. In other embodiments, the crank assembly 40 may be any other appropriate type of crank assembly, such as for example, a topwind crank, generally employing any appropriate gearing mechanism. The present teachings, however, are not limited to a particular gearing mechanism and any appropriate gearing mechanism may be used without departing from the present teachings.

In some embodiments, the crank assembly 40 may include a shaft 44 that may extend through the outer housing 24. A handle 41 may be selectively attachable to the shaft 44 by inserting the handle 41 through an aperture 42 in the shaft utilizing a pin 43. The crank assembly 40 may be operatively coupled to a jack mechanism 48, which may be generally positioned within the outer housing 24. While the jack mechanism 48 is shown in the drawings, the present teachings are not limited to such. Any kind of jack mechanism may be used without departing from the present teachings.

By way of a non-limiting example, the jack mechanism 48 may include a gear 52 secured to the shaft 44 that may rotate upon rotation of the shaft 44. The gear 52 may be operatively engageable with a crown gear 56. The crown gear 56 may be operatively engaged with a jack shaft 60 having a jack nut 61 operatively coupled thereto. Jack nut 61 may be coupled to inner housing 26 in any appropriate manner. In these embodiments, rotation the shaft 44 may rotate gears 52, 56 thereby rotating shaft 60 and causing jack nut 61 to move along shaft 60. This may transfer the horizontal rotational force into a vertical rotational force, which may raise and lower the jack nut 61. Raising and lowering the jack nut 61 may retract and extend the inner housing 26 into and from the outer housing 24 as appropriate. In some embodiments, a motor (not shown) may be attached to the shaft 44 to rotate the shaft 44 to retract and extend the inner housing 26 relative to the outer housing 24. In other embodiments, the handle 41 may be attached to the shaft 44 as appropriate to retract and extend the inner housing 26 relative to the outer housing 24.

The inner housing 26 may include a pair of apertures 66 (FIG. 5) on opposing sides 67 of the inner housing 26. The apertures 66 may be aligned on each side 67 of the inner housing 26 such that the apertures 66 may extend through the inner housing 26. While a pair of apertures 66 is shown, the inner housing 26 may include more than the pair of apertures 66. In some embodiments, a plurality of pairs of apertures 66 may be positioned along an entire length or a portion of the length of the inner housing 26. Still further, the apertures 66 may be positioned on any appropriate portion of the inner housing 26 and are not limited to be on the sides 67 nor limited to be opposed one another.

The drop leg 28 may include a plurality of apertures 68. The apertures 68 may be positioned on opposing sides 69 of the drop leg 28 and may be positioned along an entire length or a portion of the length of the drop leg 28. By way of a non-limiting example, the apertures 68 may be positioned as pairs on opposing sides 69 of the drop leg 28 and may be positioned at predetermined locations along the length of the drop leg 28. Further, by way of a non-limiting example, five pairs of such apertures 68 may be included along a portion of the length of the drop leg 28.

The drop leg 28 may be selectively positioned relative to the inner housing 26 such that one of the pair of apertures 68 of the drop leg 28 may generally align with the pair of apertures 66 of the inner housing 26. In these embodiments, a user may position the drop leg 28 manually in order to align such. In other embodiments, a user may position the drop leg 28 using an automated device, such as a motor, spring or the like (not shown). In other embodiments, instead of apertures 68 being formed in the drop leg 28, the drop leg 28 may alternatively include a plurality of pairs of detents, indentations, channels, divots, recesses, reliefs, or the like. In other embodiments, the drop leg 28 may include any combination of apertures 68, detents, indentations, channels, divots, recesses, reliefs or the like positioned along the length of the drop leg 28.

The jack 20 may further include a twin cam mechanism 70 that may be operatively coupled with the inner housing 26. The twin cam mechanism 70 may be capable of operatively engaging the inner housing 26 and drop leg 28 between disengaged and engaged positions. The twin cam mechanism 70 may be selectively moveable to a first position whereby the drop leg 28 may be capable of moving relative to the inner housing 26, which may be the disengaged position. The twin cam mechanism 70 may be selectively moveable to a second position whereby the drop leg 28 is in a fixed position relative to the inner housing 26, which may be the engaged position.

The twin cam mechanism 70 may include first and second guide members 74, 78 that may extend from opposing sides 67 of the inner housing 26 such that the first and second guide members 74, 78 may be transversely positioned relative to each other. Still further, the guide members 74, 78 may be generally aligned with one another. The guide members 74, 78 may be of any appropriate shape or size, such as by way of a non-limiting example, the guide members 74, 78 may be of a generally circular, square, rectangular, or oval cross-sectional shape.

In some embodiments, the first guide member 74 may include a first generally hollow housing member 79 and the second guide member 78 may include a second generally hollow housing member 80. The first and second housing members 79, 80 may be attached to the inner housing 26 in any appropriate manner, such as by way of a non-limiting example, the housing members 79, 80 may be welded, fastened, adhered or the like. Alternatively, the housing members 79, 80 may be integrally formed with the inner housing 26. The housing members 79, 80 may be generally hollow tubular members as shown, but are not limited to such and may be of any appropriate shape and size.

In some embodiments, the housing members 79, 80 may be welded directly to the opposing sides 67 of the inner housing 26 such that the housing members 79, 80 may extend generally laterally from the inner housing 26. In other embodiments, the first and second housing members 79, 80 may be attached to first and second plates 82, 84, respectively. In these embodiments, the plates 82, 84 may be attached to the inner housing 26 in any suitable manner, such as by example, welding, fastening, adhering or the like. The plates 82, 84 may include outer surfaces 92, 94, respectively and the housing members 79, 80 may be attached to the outer surfaces 92, 94 of the plates 82, 84 by any suitable manner, such as by way of a non-limiting example, welding, fastening, adhering or the like. During operation of the jack 20, the plates 82, 84 may be capable of engaging the base plate 32 when the drop leg 28 is retracted within the inner housing 26. The plates 82, 84 may generally prevent the base plate 32 from fully contacting the inner housing 26 when fully retracted therein during operation of the jack 20.

The first housing member 79 may include a first slot 100 and the second housing member 80 may include a second slot 102. The slots 100, 102 may be of any appropriate shape and size. It should be understood that the present teachings are not limited to the shape and size of the slots 100, 102 shown and that the slots 100, 102 may be of any appropriate shape and size. The first slot 100 may include first and second cam surfaces 104, 106 and the second slot 102 may include first and second cam surfaces 108, 110. The cam surfaces 104, 106, 108 and 110 may generally form a closed periphery of the slots 100, 102. The cam surfaces 104, 106, 108 and 110, however, may be of any appropriate shape and are not limited to that shown. Further, the cam surfaces 104, 106, 108, and 110 may be part of an open slot, not just the closed periphery shown.

The first and second guide members 74, 78 may include first and second guides 112, 114, respectively. The first and second guides 112, 114 may be attached to the first and second housing members 79, 80 in any appropriate manner, such as by way of a non-limiting example, welding, fastening, using adhesives or the like. The first and second guides 112, 114 may generally be positioned within the housing members 79, 80, respectively.

The first guide member 74 may include a first engaging member 120 and the second guide member 78 may include a second engaging member 124. In some embodiments, first and second engaging members 120, 124 may include a pin as shown in the drawings. It should be understood, however, that any appropriate engaging member may be used, for example, rods, tubes, slugs, tabs, or the like and the present teachings are not limited to the pins shown. The engaging members 120, 124 may be any appropriate shape and size. The engaging members 120, 124 may be retained within the first and second guides 112, 114, respectively of the housing members 79, 80. The first and second guides 112, 114 may generally position or align the first and second engaging members 120, 124 in the appropriate position and may generally prevent the engaging members 120, 124 from becoming generally misaligned. The engaging members 120, 124 may be selectively positionable between first and second positions. In the first position, the engaging members 120, 124 may be disengaged from at least one of the apertures 66 of the inner housing 26 and the one of the generally aligned pairs of apertures 68 in the drop leg 28. In the second position, the engaging members 120, 124 may engage the apertures 66 of the inner housing 26 and one of the generally aligned pairs of apertures 68 of the drop leg 28, thereby axially retaining the drop leg 28 in a selectively fixed position relative to the inner housing 26 (i.e., the engaging members 120, 124 may be in the engaged position). In the second position, the engaging members 120, 124 may be capable of transferring force between the drop leg 28 and inner housing 26 of the jack 20, thereby allowing jack 20 to support a load with drop leg 28 axially fixed relative to inner housing 26. Further, the engaging members 120, 124 engaging the apertures 66, 68 of the first housing 26 and drop leg 28, may allow an increase in the vertical load holding capability/rating of the jack 20 versus those jacks that utilize a single engaging member, which may expand the capabilities of the jack 20.

The engaging members 120, 124 being in the first position may allow the drop leg 28 to be positioned relative to the inner housing 26. In other words, the engaging members 120, 124 being in the first position may release the drop leg 28 relative to the inner housing 26 such that the drop leg 28 may extend and/or retract within the inner housing 26 (i.e., the engaging members 120, 124 may be in the disengaged position). The engaging members 120, 124 in this first position may provide quick elongation or retraction of the jack 20, or more specifically, the drop leg 28 relative to inner housing 26.

Further, first and second biasing members 130, 134 may be operatively engaged with the engaging members 120, 124, respectively, within the housing members 79, 80. More specifically, the biasing members 130, 134 may be generally positioned between the first and second guides 112, 114, respectively. The biasing members 130, 134 may further be positioned within the housing members 79, 80, respectively. The biasing members 130, 134 may, by way of a non-limiting example, be a compression spring. The biasing members 130, 134, however, may be any appropriate biasing member, and is not limited to being a compression spring. Still further, the biasing members 130, 134 while shown as being generally the same, may be different types and styles of biasing members. In some embodiments, the biasing members 130, 134 may be telescopingly engaged with the engaging members 120, 124. In these embodiments, the biasing members 130, 134 may bias the engaging members 120, 124 toward the inner housing 26 (i.e., in the second position) whereby the engaging members 120, 124 may engage the apertures 66, 68 of the inner housing 26 and drop leg 28, respectively.

The twin cam drop leg mechanism 70 may further include a handle 140 that may be operatively engaged with the engaging members 120, 124. In these embodiments, the handle 140 may be actuated to selectively position the engaging members 120, 124 to and from the first and second positions to selectively allow movement of drop leg 28 relative to inner housing 26 and to generally prevent movement of drop leg 28 relative to the inner housing 26. Further, the biasing members 130, 134 biasing the engaging members 120, 124 toward the first position may also serve to hold the handle 140 in a particular orientation, such as a generally elevated position. This may generally prevent the handle 140 from falling toward the base plate 32 (i.e., the biasing members 130, 134 may serve to cause the handle 140 to seek one of two detent positions). In these embodiments, the biasing members 130, 134 may cause the handle 140 to position the engaging members 120, 124 against the surface 69 of the drop leg 28. This may generally prevent the handle 140 from positioning to the engaged position unless and until the engaging members 120, 124 enter and engage the apertures 68 of the drop leg 28. The handle 140 being incapable of being positioned further may indicate that the engaging members 120, 124 have not engaged the apertures 68 of the drop leg 28 and may indicate that the twin cam mechanism 70 is not engaged appropriately to limit movement of drop leg 28 relative to inner housing 26.

The handle 140 may include a first handle portion 144 and a second handle portion 148. The first and second handle portions 144, 148 may each be a generally L-shaped rod, but are not limited to such shape. The handle portions 144, 148 may be any appropriate shape and size. The first handle portion 144 may include first and second end portions 152, 154 and the second handle portion 148 may include first and second end portions 156, 158. In some embodiments, the first ends 152, 156 of the first and second handle portions 144, 148 may be operatively coupled by a connecting member 159, such as a tubular member. The second end portions 154, 158 may be operatively engaged with the engaging members 120, 124, respectively.

In some embodiments, one end of the connecting member 159 may slidably receive the first end portion 152 of the first handle portion 144 and may be fixedly secured to the first end portion 156 of the second handle portion 148. Alternatively, the connecting member 159 may slidably receive the first end portion 156 of the second handle portion 148 and be fixedly secured to the first end portion 152 of the first handle portion 144. In other embodiments, the connecting member 159 may slidably receive both of the first end portions 152, 156 of the first and second handle portions 144, 148. In the embodiments in which the connecting member 159 is fixedly secured to one of the first end portions 152, 156 of the first and second handle portions 144, 148, the connecting member 159 may be welded, fastened, adhered or the like.

In the embodiments in which the connecting member 159 may be slidably engaged with one of the first end portions 152, 156, the first and/or second handle portions 144, 148 may move laterally while moving to and from the first and second positions. Despite this lateral movement, the first end portions 152, 156 may remain received within the connecting member 159. By way of a non-limiting example, when the handle 140 may be pivoted from the first position to the second position and the first end 152 of the first handle portion 144 may be slidably received within the connecting member 159, the first end 152 of the first handle portion 144 may slide within the connecting member 159 while at least a portion of such remains within the connecting member 159.

The connecting member 159 may be made of any appropriate material. By way of a non-limiting example, the connecting member 159 may be made of a generally elastomeric material such that gripping the connecting member 159 may be generally softer. This may result in the handle 140 being ergonomically beneficial to a user.

The second end portions 154, 158 of the first and second handle portions 144, 148 may be secured to the engaging members 120, 124. By way of a non-limiting example, the first engaging member 120 may include a first aperture 160 and the second engaging member 124 may include a second aperture 162. The apertures 160, 162 may be shaped and sized to have inserted therein the end portions 154, 158 of the first and second handle portions 144, 148. In some embodiments, the second end portion 154 of the first handle portion 144 may be inserted through the first aperture 160 such that it may be moveable within the first aperture 160 and the second end portion 158 of the second handle portion 148 may be fixedly secured to the second engaging member 124. In these embodiments, the second end portion 158 of the second handle portion 148 may be fixedly secured to the engaging member 124 by welding, fastening, adhering or the like.

In some embodiments, the second engaging member 124 may include the second aperture 162 such that the second end portion 158 of the second handle portion 148 may be inserted therein and then fixed thereto. Alternatively, the second engaging member 124 may not include the second aperture 162 and the second end portion 158 may be fixed directly to the second engaging member 124. In other embodiments, the second end portion 154 of the first handle portion 144 may be fixedly secured to the first engaging member 120. In these embodiments, the first engaging member 120 may or may not include the first aperture 160. In other embodiments, both of the first and second handle portions 144, 148 may be inserted through the apertures 160, 162 and may not be otherwise fixed to the engaging members 120, 124.

In some embodiments, the first or second handle portion 144, 148 that may be fixedly secured to the connecting member 159 may likewise be fixedly secured to the engaging member 120, 124. The other of the first or second handle portion 144, 148 not fixedly secured to the connecting member 159 may be slidably received within the connecting member 159 and held within the aperture 160, 162 of the engaging member 120, 124, as applicable. By way of a non-limiting example, the first end portion 152 of the first handle portion 144 may be fixed to the connecting member 159 and the second end portion 154 may be fixed to the first engaging member 120. The first end 156 of the second handle portion 148 may be slidably received within the connecting member 159 and the second end 158 may be inserted into the second aperture 162 of the second engaging member 124. The second handle portion 148 may then be adjustable so that it may telescope or slide within the connecting member 159 relative to the first handle portion 144. This may allow and maintain the required alignment as the distance between the first and second handle portions 144, 148 varies while the handle 140 is being actuated. This sliding or telescoping may allow for certain manufacturing tolerances that may be present, i.e., it may account for variances present during manufacturing of the various components. Further this floating side may generally self align with the master or fixed handle portion, i.e., the second handle portion 148 may self align with the first handle portion 144. In other embodiments, the first handle portion 144 may be adjustable while the second handle portion 148 may be fixed.

In engaging the first and second handle portions 144, 148 with the apertures 160, 162 of the engaging members 120, 124, the first and second handle portions 144, 148 may extend through the slots 100, 102 in the housing members 79, 80. In these embodiments, the handle 140 may be restrained within the slots 100, 102. More specifically, the first and second handle portions 144, 148 may be capable of engaging the cam surfaces 104, 106, 108, and 110 depending upon the position of the handle 140 and/or direction of impending travel. By way of a non-limiting example, when the handle 140 is in the first position the first handle portion 144 may engage the second cam surface 106 of the first slot 100. Similarly, the second handle portion 148 may engage the second cam surface 110 of the second slot 102. When the handle 140 is pivoted to the second position, the first handle portion 144 may move along the first slot 100 engaging the second cam surface 106 and the second handle portion 148 may move along the second slot 102 engaging the second cam surface 110. If, however, the handle 140 is in the second position and the engaging members 120, 124 have not engaged the apertures 68 of the drop leg 28 appropriately, the first handle portion 144 may engage the first cam surface 104 of the first slot 100 and the second handle portion 148 may engage the first cam surface 108 of the second slot 102. The first and second handle portions 144, 148 engaging the first cam surfaces 104, 108 may generally prevent the handle 140 being positioned further, which may indicate that the engaging members 120, 124 have not engaged the apertures 68 of the drop leg 28 and may indicate that the twin cam mechanism 70 is not engaged appropriately.

Figure 1:
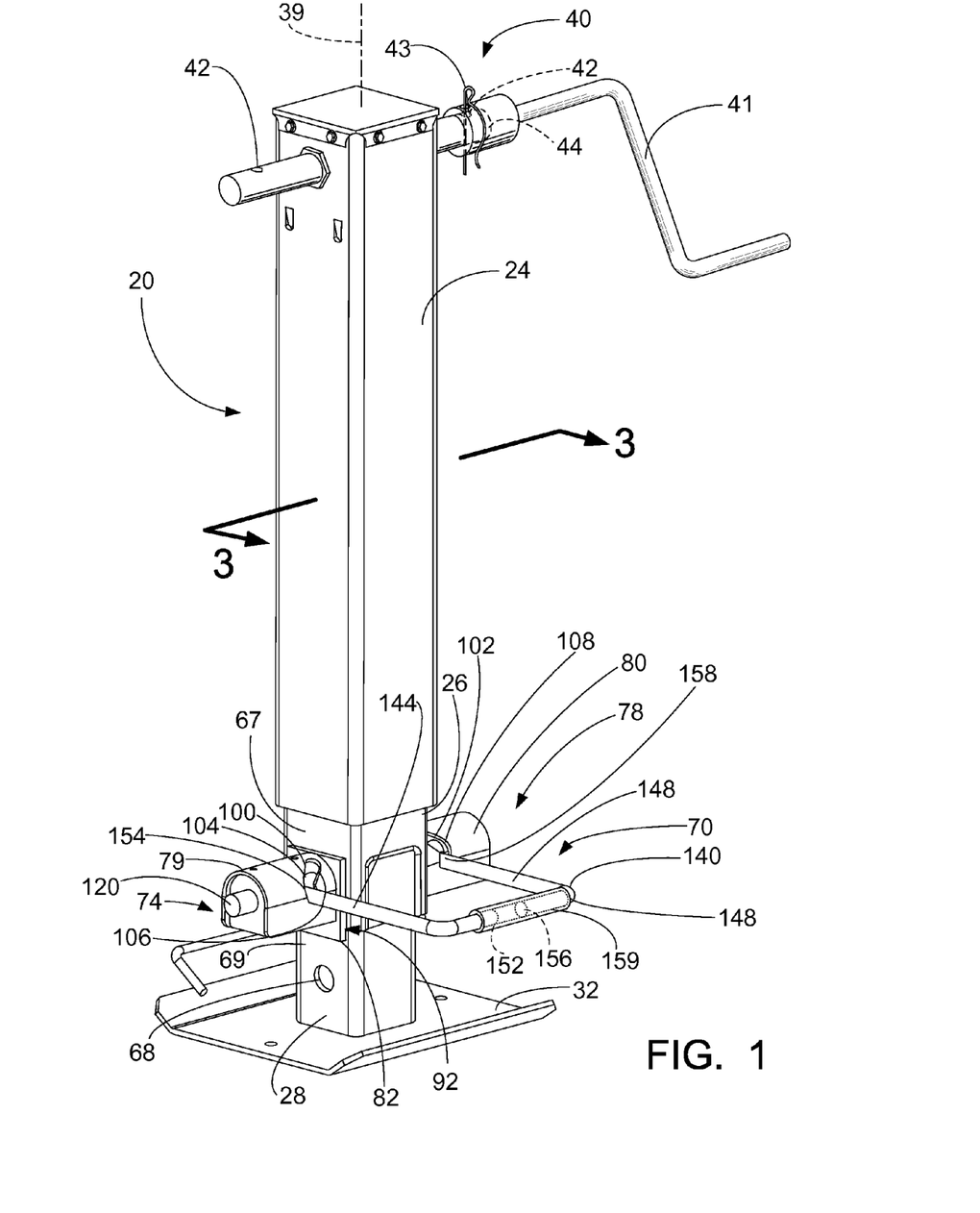
FIG. 1 is a perspective view of an embodiment of a jack with a drop leg assembly having a twin cam mechanism in a disengaged position.
Figure 2:
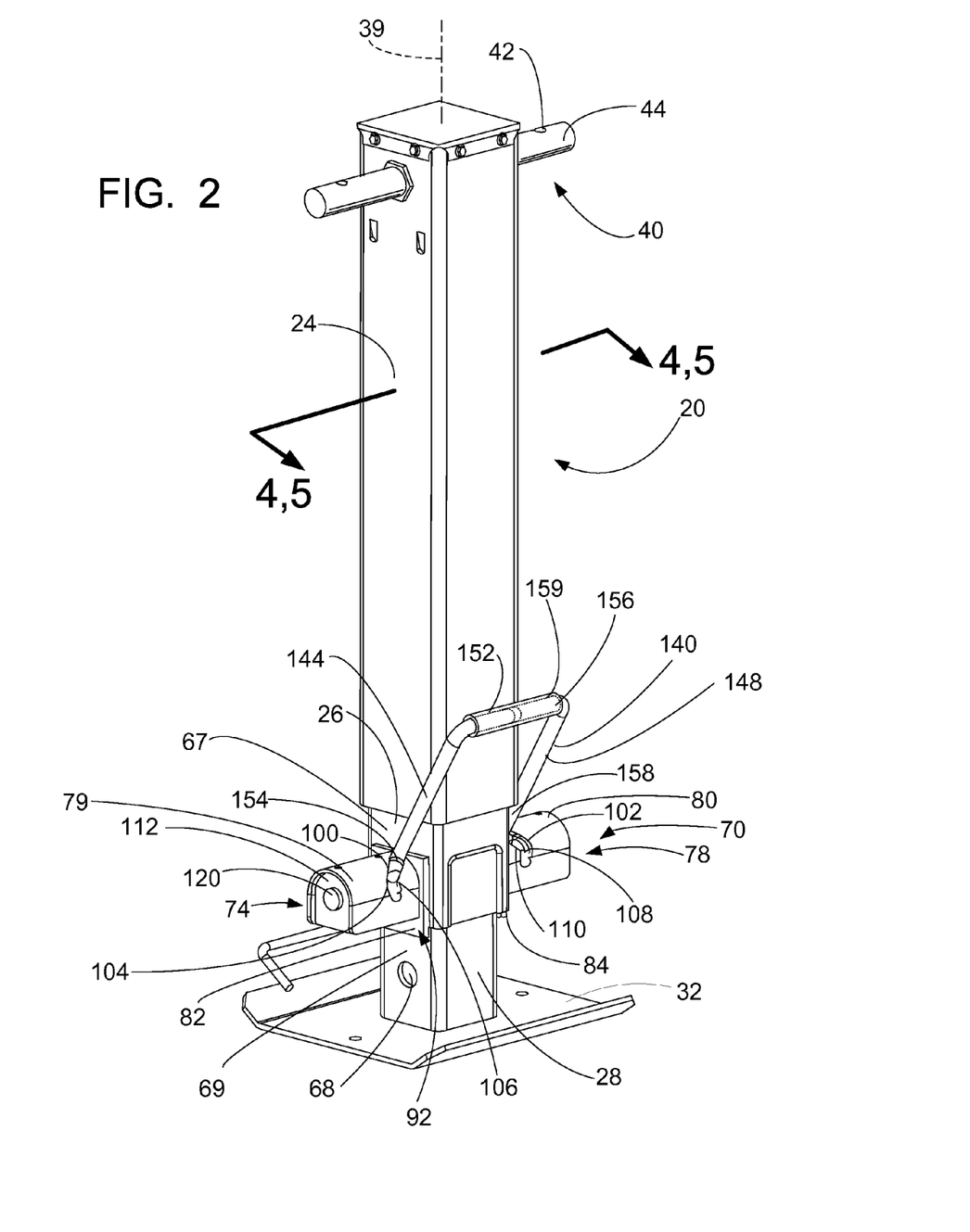
FIG. 2 is a perspective view of the jack with a drop leg assembly having the twin cam mechanism in an engaged position.
Figure 3:
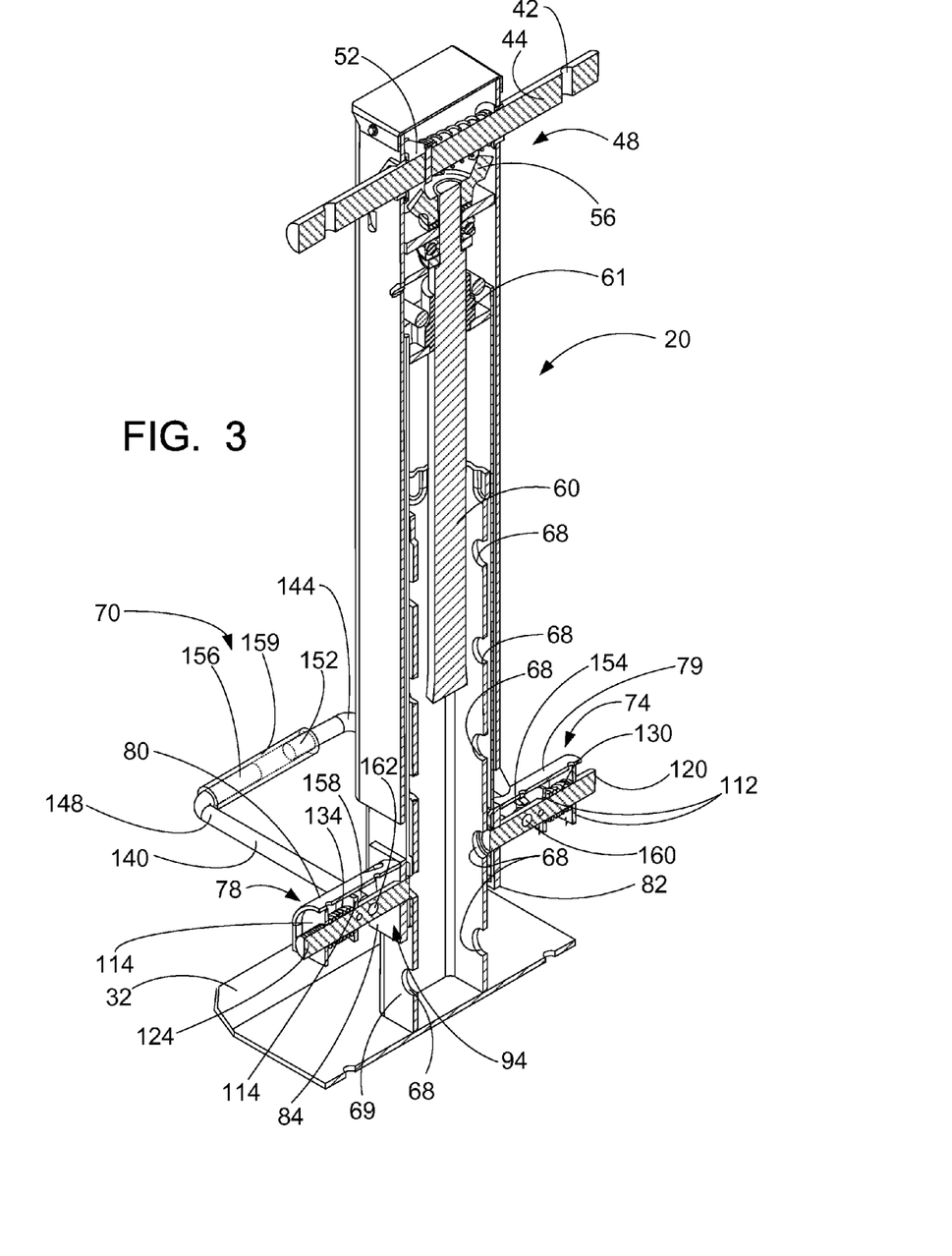
FIG. 3 is perspective cross-sectional view of the jack with the drop leg assembly of FIG. 1 along line 3-3.
Figure 4:
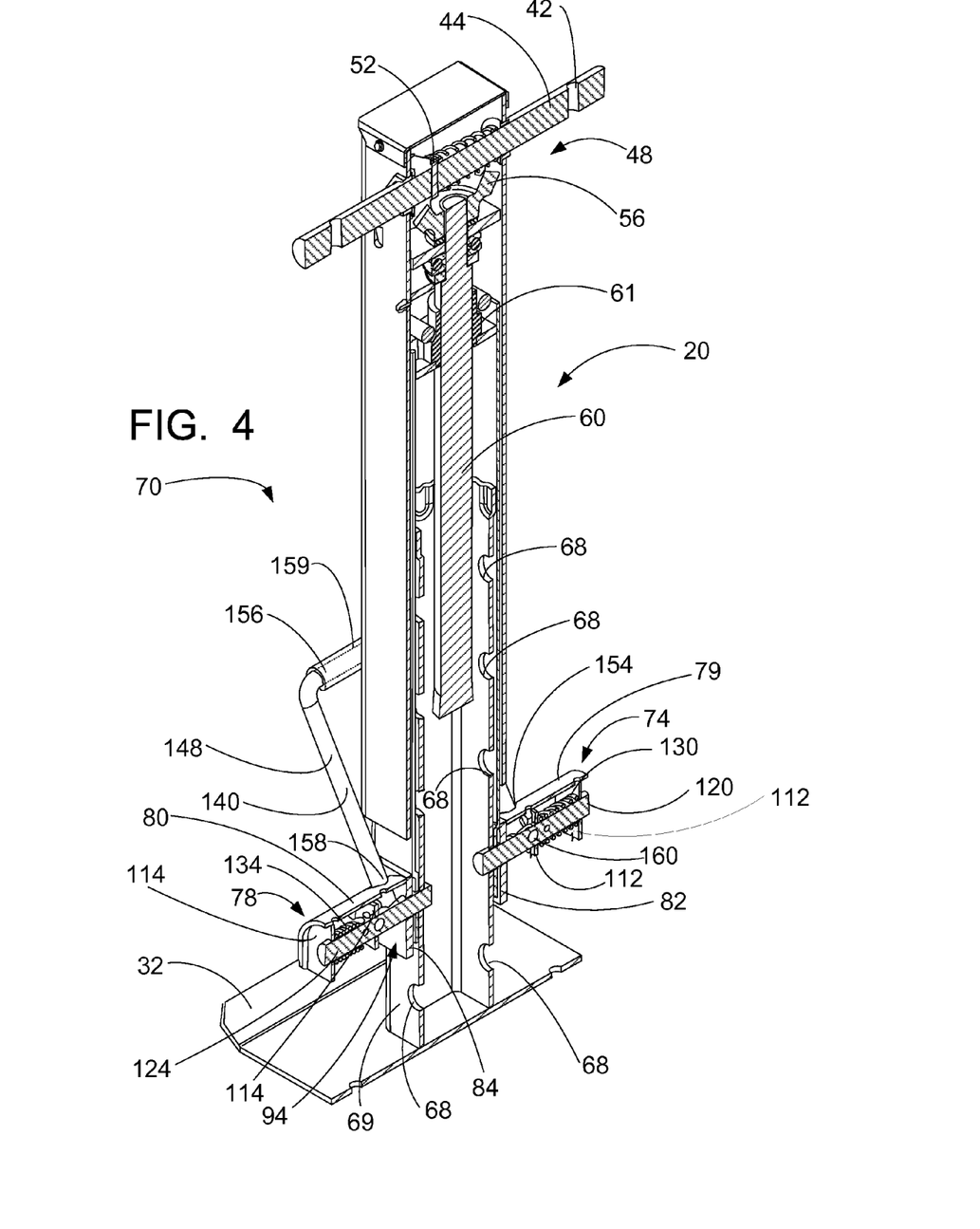
FIG. 4 is a perspective cross-sectional view of the jack with the drop leg assembly of FIG. 2 along line 4-4.
Figure 5:
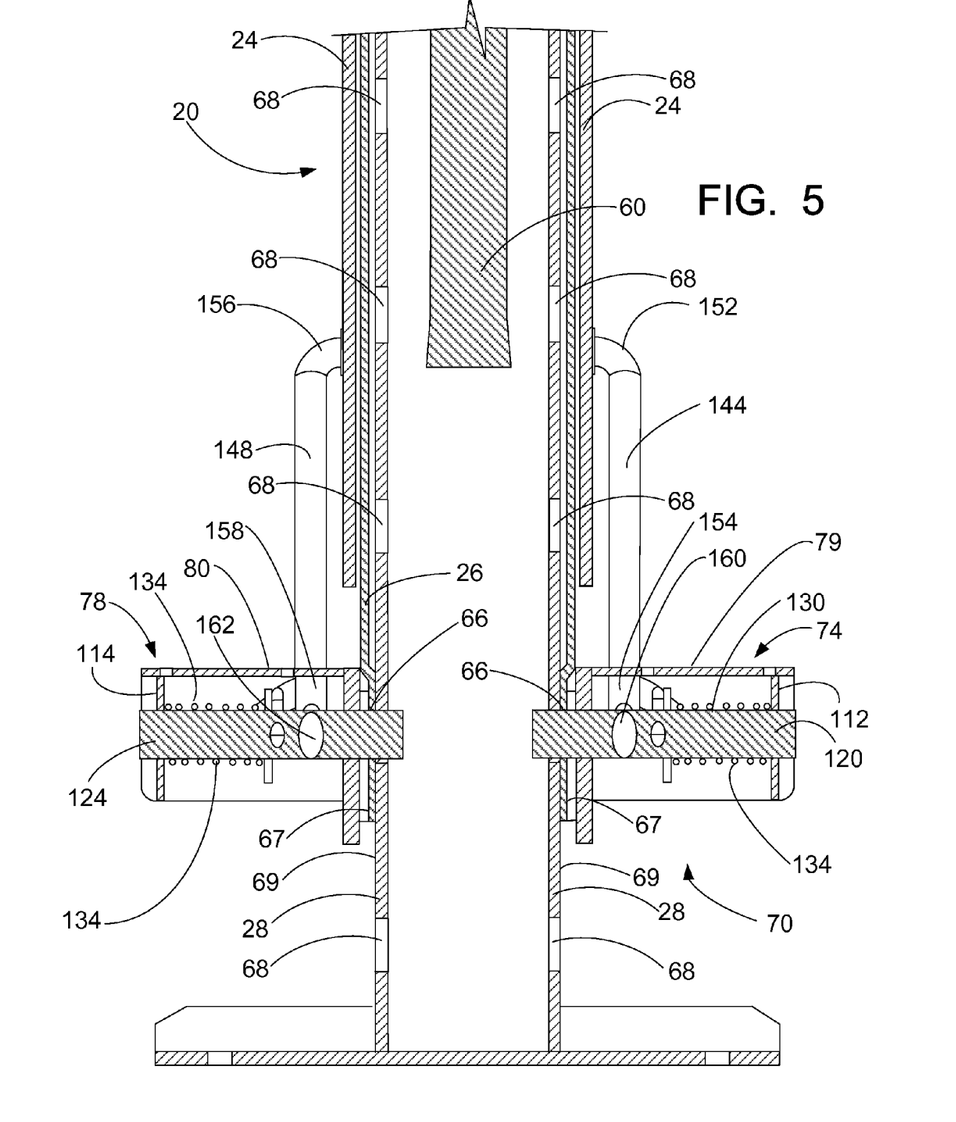
FIG. 5 is a fragmented cross-sectional view of a portion of the jack with the drop leg assembly of FIG. 2 along line 5-5.
Figure 6:
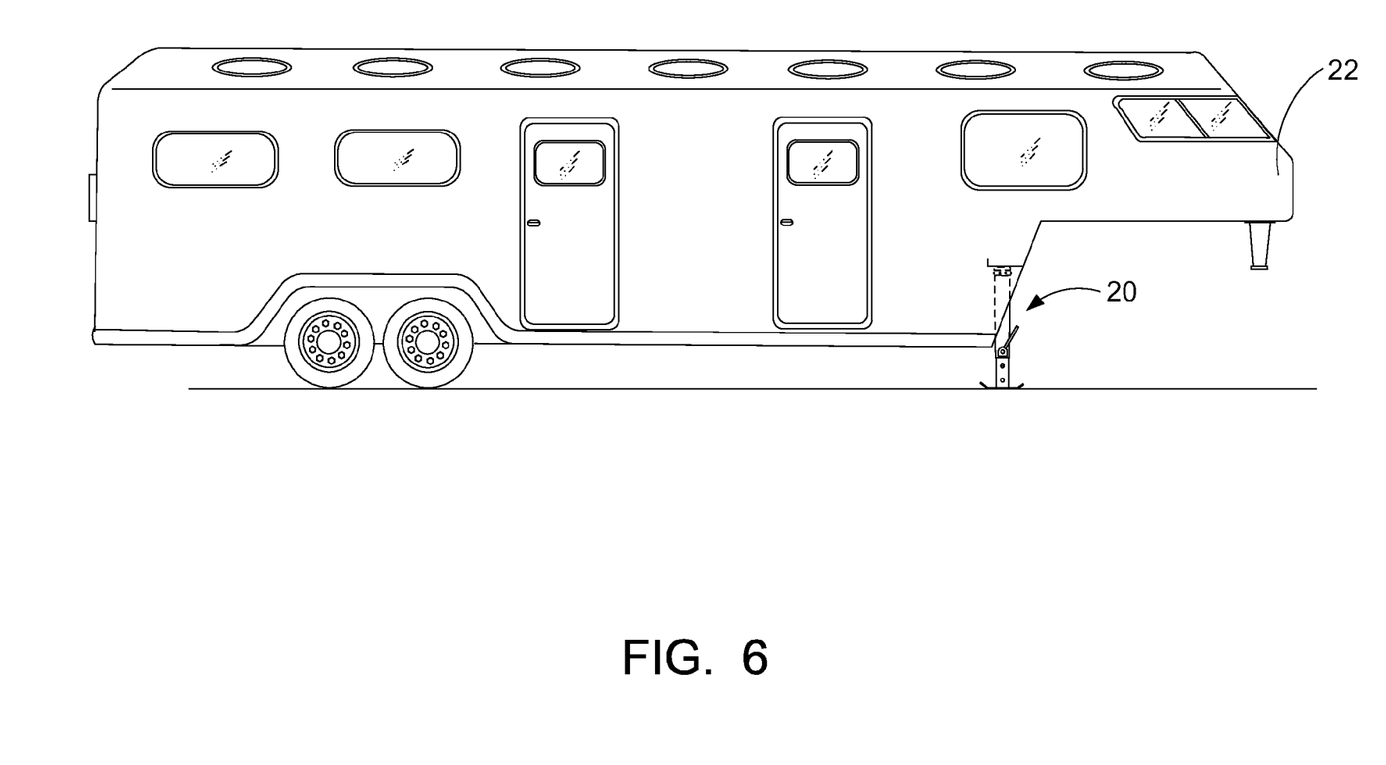
FIG. 6 is a perspective view of the jack with a drop leg assembly used with a towed vehicle.

In operation of the jack 20, the handle 140 may be actuated or pivoted between the first and second positions. The first position may be the disengaged position such as shown in FIGS. 1, 3, and 8 and the second position may be the engaged position such as shown in FIGS. 2, 4, 5 and 7. In the engaged position, the drop leg 28 may be fixed relative to the inner housing 26. Further, the first engaging member 120 may engage the apertures 66 of the first housing 26 and one of the pairs of apertures 68 of the drop leg 28 and the second engaging member 124 may engage the apertures 66 of the first housing 26 and one of the pairs of apertures 68 of the drop leg 28.

Figure 7:
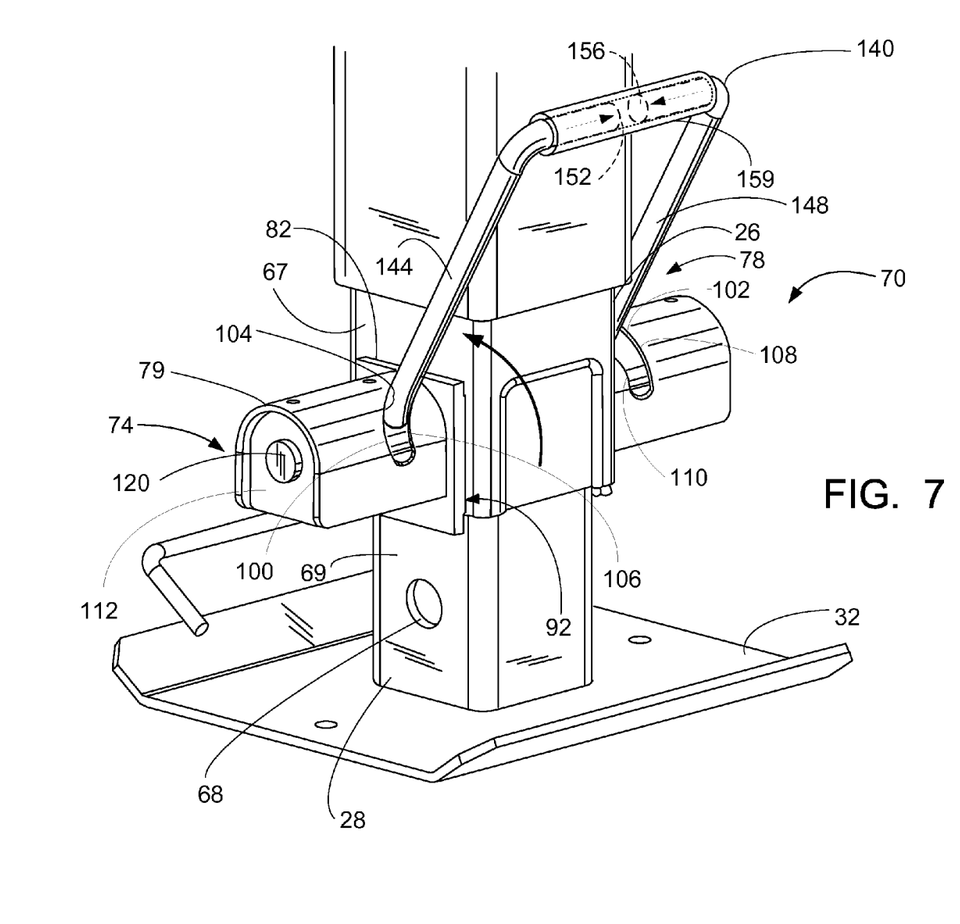
FIG. 7 is a perspective view of a portion of the jack with the drop leg assembly of FIG. 2 in the engaged position.
Figure 8:
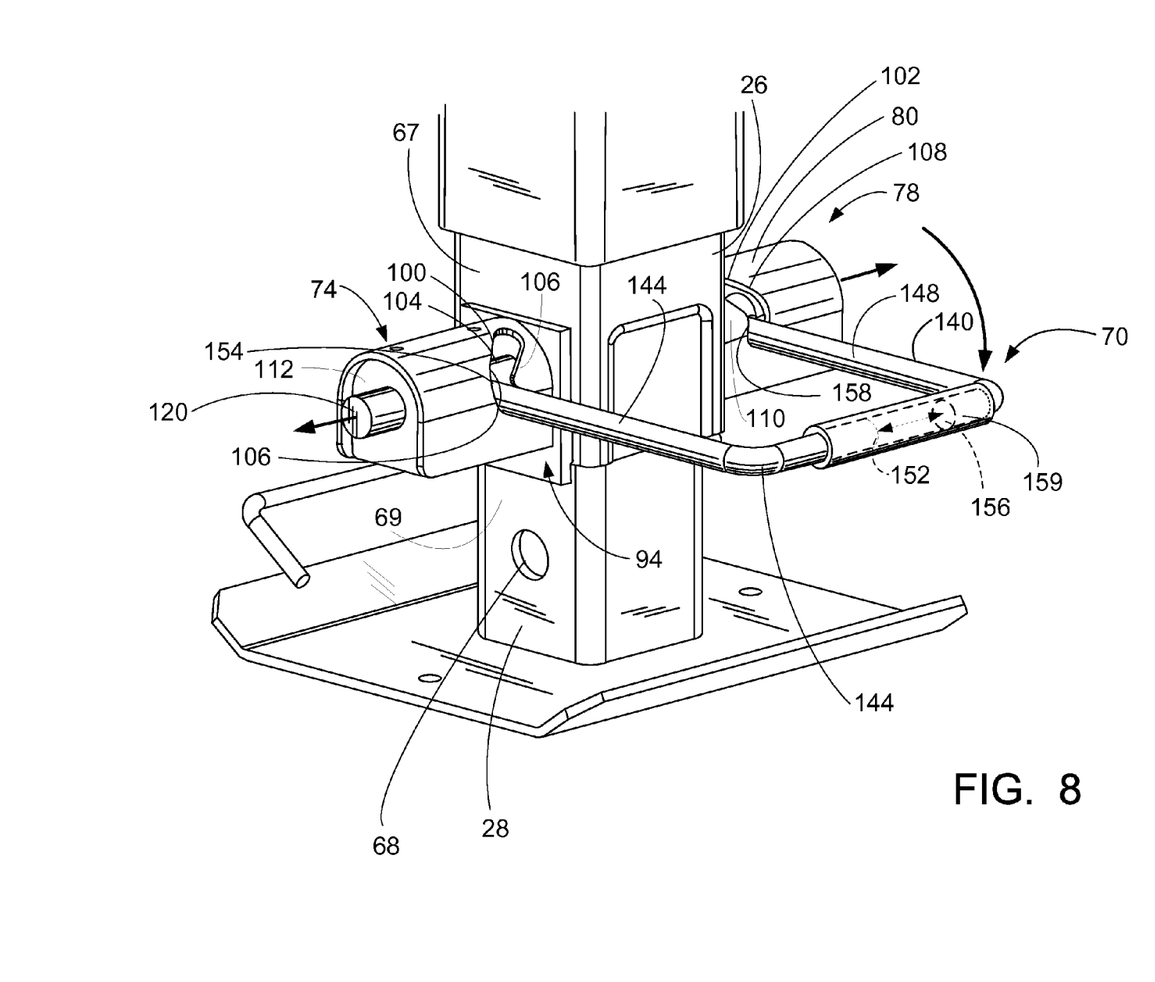
FIG. 8 is a perspective view of a portion of the jack with the drop leg assembly of FIG. 1 in the disengaged position.

The handle 140 may be actuated, as indicated by the arrow of FIG. 8, from the second position or engaged position shown in FIG. 7 toward the first position or disengaged position shown in FIG. 8. During actuation of the handle 140 the first handle portion 144 may transition along the second cam surface 106 by following the first slot 100. During this transition, the first handle portion 144 may move laterally away from the inner housing 26 and drop leg 28. This may slide the engaging member 120 against the biasing of the biasing member 130 and disengage it from the apertures 68, or in some embodiments, it may disengage it from both the apertures 66, 68. Simultaneously, the second handle portion 148 may transition along the second cam surface 110 by following the second slot 102. During this transition, the second handle portion 144 may move laterally away from the inner housing 26 and drop leg 28. This may slide the engaging member 124 against the biasing of the biasing member 134 and disengage it from the apertures 66, 68 or it may disengage it from just the apertures 68. As previously noted, either of the first end portions 152, 156 of the first or second handle portion 144, 148 sliding within the connecting member 159 may help maintain the first end portions 152, 156 within the connecting member 159 and may generally keep the second end portions 154, 158 aligned.

To return the drop leg 28 to the second position, i.e., the engaged or fixed position, the drop leg 28 may be positioned relative to the inner housing 26 such that the apertures 66 may generally align with one of the pair of apertures 68. When generally aligned, the handle 140 may be actuated, such as in a direction of the arrow shown in FIG. 7, toward the second position or engaged position. During actuation of the handle 140, the first handle portion 144 may transition from the second cam surface 106 to the first cam surface 104 by following the first slot 100 when the biasing member 130 is not able to force the engaging member 120 to engage the aperture 68. This may include situations in which the engaging member 120 is misaligned with at least one of the apertures 66 and/or 68, there is rust present preventing such engagement, there is debris preventing such engagement or the like. During this transition, the first handle portion 144 may move laterally toward the inner housing 26 and drop leg 28. The engaging member 120 may then slide toward and engage the apertures 66, 68, generally securing the drop leg 28 relative to the inner housing 26. Simultaneously therewith, the second handle portion 148 may transition from the second cam surface 106 to the first cam surface 108 by following the second slot 102 when the biasing member 134 is not able to force the engaging member 124 to engage the aperture 68. This may include situations in which the engaging member 124 is misaligned with at least one of the apertures 66 and/or 68, there is rust present preventing such engagement, there is debris preventing such engagement, or the like. During this transition, the second handle portion 148 may move laterally towards the inner housing 26 and drop leg 28. The engaging member 124 may then slide into the apertures 66, 68 engaging such. In this embodiment, the biasing members 130, 134 may bias the engaging members 120, 124 toward the apertures 66, 68, which may assist with the engaging members 120, 124 engaging the apertures 66, 68. Still further, one of the first end portions 152, 156 of the first and second handle portions 144, 148 may slide within the connecting member 159 toward the other of the first end portions 152, 156 of the first and second handle portions 144, 148.

Moreover, the first cam surfaces 104, 108 may force or drive the engaging members 120, 124, respectively into apertures 68 when the apertures 68 are generally aligned with the engaging members 120, 124. More specifically, the first and second handle portions 144, 148 may be forced by the first cam surfaces 104, 108 of the first and second slots 100, 102 to travel generally towards the drop leg 28 as the handle 140 is being positioned to the second or engaged position. This may then drive the engaging members 120, 124 towards the apertures 68 to engage such. The twin cam mechanism 70, therefore, may need not rely solely on the biasing members 130, 134 to drive the engaging members 120, 124 into engagement with the apertures 68; the second camming surfaces 106, 110 may also do so. Still further, when the engaging members 120, 124 are not engaged with the apertures 68 but are only engaged against the surface 69 of the drop leg 28, the handle 140 may generally be prevented from being positioned to the fully engaged position. The handle 140 may only be capable of doing so when the engaging members 120, 124 enter and engage the apertures 68 of the drop leg 28. The handle 140 being incapable of positioning further may indicate that the engaging members 120, 124 have not engaged the apertures 68 of the drop leg 28 and may indicate that the twin cam mechanism 70 is not engaged appropriately.

In these embodiments, the engaging members 120 and 124 may move substantially co-linear with each other when engaging or disengaging the apertures 66, 68. This may assist in maintaining general alignment between the inner housing 26 and the drop leg 28. This alignment may provide improved shear geometry for the engaging members 120, 124 as well as helping provide general straightness of the jack 20. Using the cam motion of the cam surfaces 104, 106, 108, 110 to extend and retract the engaging members 120, 124, as applicable, may provide the operator with knowledge of the correct actuation and engagement of the twin cam drop leg mechanism 70.

While each side of the twin cam mechanism 70 is shown as being a generally mirror image of the other side, the present teachings are not limited to such. One side of the twin cam mechanism 70 may have different shaped and/or sized: housing members 79, 80; slots 100, 102; engaging members 120, 124; handle portions 144, 148; and biasing members 130, 134, as appropriate.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A jack comprising:
    a first housing having a pair of apertures;
    a pair of cam surfaces;
    a second housing telescopically moveable relative to the first housing, the second housing having a plurality of pairs of apertures;
    a pair of engaging members positionable to a first position extending into the apertures of the first housing and at least one of the pair of apertures of the second housing generally inhibiting relative telescopic movement between the first and second housings and a second position allowing relative telescopic movement between the first and second housings; and
    a handle attached to the engaging members, wherein the handle is selectively positionable along the cam surfaces to a first handle position positioning the engaging members to the first positions and a second handle position positioning the engaging members to the second position, whereby the handle is generally prevented from moving to the first handle position until the engaging members are in the first position.

2. The jack of claim 1 further comprising a pair of guide members attached to the first housing, wherein the cam surfaces are positioned on the guide members.

3. The jack of claim 2, wherein the pair of guide members each include a slot having two sides and the two sides of the slots define the cam surfaces.

4. The jack of claim 2, wherein the engaging members are positioned within the guide members.

5. The jack of claim 1, wherein the handle comprises a first handle portion and a second handle portion, the first handle portion being laterally positionable relative to the second handle portion.

6. The jack of claim 1, wherein the pair of engaging members comprises a pair of pins.

7. The jack of claim 1 further comprising:
    a third housing telescopingly engaged with the first housing, wherein the first and third housings are telescopingly moveable relative to one another; and
    a drive mechanism capable of causing relative telescopic movement between the first and third housings.

8. The jack of claim 7, wherein the second housing is telescopically moveable relative to the third housing.

9. A jack comprising:
    a housing having a pair of apertures;
    a drop leg telescopingly moveable relative to the housing along an axis, wherein the drop leg includes at least a pair of apertures;
    a pair of cam surfaces;
    a pair of engaging members operatively attached with the housing; and
    a handle attached to the engaging members, the handle positionable along the cam surfaces to of positively drive the engaging members in a first direction engaging the apertures of the housing and the apertures of the drop leg and in a second direction disengaging the apertures of the drop leg.

10. The jack of claim 9 further comprising a pair of biasing members biasing the engaging members towards engaging the apertures of the housing and drop leg.

11. The jack of claim 10, wherein the biasing member biases the handle against gravity, generally preventing the handle from falling.

12. The jack of claim 9, wherein the handle is selectively positionable from a first position wherein the engaging members are driven in the first direction to a second position wherein the engaging members are driven in the second direction.

13. The jack of claim 12 further comprising a pair of guide members attached to the housing, wherein the guide members each include a fixed cam surface and wherein the engaging members are positioned within the guide members.

14. The jack of claim 13, wherein the cam surfaces laterally displace the handle relative to the axis during selective positioning of the handle from the first position to the second position.

15. The jack of claim 14, wherein laterally displacing the handle drives the engaging members in either of the first or second direction.

16. The jack of claim 15, further comprising an alignment indicator capable of identifying engagement of the engaging members with the apertures of the drop leg.

17. The jack of claim 16, wherein the alignment indicator includes the handle being generally incapable of being positioned to the first position.

18. The jack of claim 12, wherein the handle drives the engaging members toward the second position irrespective of whether the pair of apertures of the first housing are aligned with the at least a pair of apertures of the drop leg.

19. The jack of claim 9, wherein the pair of engaging members comprises a pair of pins.

20. The jack of claim 9 further comprising:
    a second housing telescopingly engaged with the first housing, wherein the first and second housings are telescopingly moveable relative to one another; and
    a drive mechanism capable of causing relative telescopic movement between the first and third housings.

21. The jack of claim 20, wherein the drop leg is telescopically moveable relative to the second housing.

22. A jack comprising:
    a housing having a pair of apertures;
    a drop leg operatively engaged with the housing, wherein the drop leg includes a plurality of apertures;
    a pair of guide members attached to the housing;
    a pair of engaging members positioned within the guide members;
    a handle having a pair of first and second ends, the second ends attached to the engaging members, the handle capable of being selectively positioned, wherein selective positioning of the handle engages or disengages the engaging members with the apertures of the housing and a pair of the plurality of apertures of the drop leg; and
    wherein the first ends of the handle are moveable relative to one another during selective positioning of the handle.

23. The jack of claim 22 further comprising a connecting member, wherein the first ends of the handle are received within the connecting member.

24. The jack of claim 23, wherein at least one of the pair of engaging members includes an engaging member aperture.

25. The jack of claim 24, wherein the first ends are slidably received within the connecting member and at least one of the second ends is received in the engaging member aperture of the at least one of the pair of engaging members.

26. The jack of claim 25, wherein the at least one of the second end portions of the handle are moveable within the engaging member aperture of the at least one of the pair of engaging members.

27. The jack of claim 22, wherein the guide members are generally hollow tubular members, wherein the generally hollow tubular members each include a cam surface wherein the cam surfaces laterally displace the first ends of the handle during selective positioning of the handle.

28. The jack of claim 22, wherein the pair of engaging members comprises a pair of pins.

29. The jack of claim 22 further comprising:
a second housing telescopingly moveable with the housing; and
a drive mechanism capable of causing relative telescopic movement between the housing and second housings.

30. The jack of claim 29, wherein the drop leg is telescopically moveable relative to at least one of the housing and second housings.

31. A jack comprising:
a first housing having a pair of apertures;
a pair of cam surfaces;
a second housing telescopically moveable relative to the first housing, the second housing having a plurality of pairs of detents;
a pair of engaging members positionable to a first position extending into the apertures of the first housing and at least one of the pair of detents of the second housing generally inhibiting relative telescopic movement between the first and second housings and a second position allowing relative telescopic movement between the first and second housings; and
a handle attached to the engaging members, wherein the handle is selectively positionable along the cam surfaces positioning the engaging members to the first and second positions.

32. The jack of claim 31, wherein the engaging members in the second position disengage from the at least one of the pair of detents of the second housing.

33. A jack comprising:
a first housing having a pair of apertures;
a second housing telescopingly moveable relative to the first housing along an axis, wherein the second housing includes at least a pair of apertures;
a pair of engaging members operatively attached with the first housing;
a handle attached to the engaging members, the handle positively driving the engaging members in a first direction engaging the apertures of the first housing and the apertures of the second housing and in a second direction disengaging the apertures of the second housing; and
an alignment indicator capable of identifying engagement of the engaging members with the apertures of the second housing.

34. The jack of claim 33, wherein the second housing comprises a drop leg.

35. The jack of claim 33, wherein the alignment indicator includes the handle being generally incapable of being positioned to the first position.

* * * * *